United States Patent
Benayoun et al.

(10) Patent No.: US 6,426,953 B1
(45) Date of Patent: Jul. 30, 2002

(54) METHOD OF OPERATING AN INTERNAL HIGH SPEED ATM BUS INSIDE A SWITCHING CORE

(75) Inventors: Alain Benayoun, Cagnes-sur-mer; Patrick Michel, La Gaude; Claude Pin, Nice; Gilles Toubol, Villeneuve-Loubet, all of (FR)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/189,871

(22) Filed: Nov. 10, 1998

(30) Foreign Application Priority Data

Nov. 28, 1997 (EP) .............................. 97480080

(51) Int. Cl.$^7$ ............................. H04L 12/56
(52) U.S. Cl. ................ 370/395.1; 370/395.71
(58) Field of Search ............ 370/395.1, 395.2, 370/395.21, 395.3, 395.4, 401–2, 412, 438, 489, 458, 503, 509, 516, 520, 395.7, 395.71, 395.72, 413; 710/107, 109–10, 111–13, 114–117, 126, 131

(56) References Cited

U.S. PATENT DOCUMENTS

| | | | |
|---|---|---|---|
| 5,452,330 A | * | 9/1995 | Goldstein ................. 370/257 |
| 5,499,235 A | * | 3/1996 | Houdoin et al. ............ 370/13 |
| 5,841,774 A | * | 11/1998 | Flinck et al. ............. 370/399 |
| 5,949,785 A | * | 9/1999 | Beasley .................... 370/398 |

* cited by examiner

*Primary Examiner*—David Vincent
(74) *Attorney, Agent, or Firm*—John B. Frisone

(57) ABSTRACT

The ATM bus (100) is composed of a clock signal, CLK, a synchronization signal, -SYNC, a data bus, S(0-31), and an adapter identification bus, SID(0-3). It is a synchronous bus running at any clock rates. The clock signal is generated by the backplane (20) and transmitted to each adapter (10-1, . . . 10-N). During each clock cycle, the data bus has three serialized operation modes (or cycles) defined in this order: a bus_req cycle of 1 clock period, a bus_ack cycle of 1 clock period and an ATM cell_xfr cycle of 14 clock periods. The free-running synchronization signal is generated on the backplane (20) and transmitted to each adapter (10-1, . . . , 10-N). The activation of the synchronization signal of one bit of the data bus, S(0-31), starts the bus_req cycle. In each case, the remaining data bus signals are left in high impedance state. To increase the bus performance, the synchronization signal is held active until an adapter activates its bus_request signal. For the bus_ack cycle, an arbiter located in a control logic (102) determines which adapter has the bus granted for its data transfer by generating an acknowledge signal to the corresponding requester during one clock period following the deactivation of the synchronization signal. The next fourteen clock periods starts the xfer_cycle for transferring one ATM cell from a requester adapter to a destination adapter. At the end of this transmission, another req_cycle starts by the activation of the synchronization signal.

10 Claims, 16 Drawing Sheets

FIFO IN

| | ATM CELL BYTE 53 | ATM CELL BYTE 52 | ATM CELL BYTE 51 |
|---|---|---|---|
| ATM CELL BYTE 50 | ATM CELL BYTE 49 | ATM CELL BYTE 48 | ATM CELL BYTE 47 |
| ATM CELL BYTE 46 | ATM CELL BYTE 45 | ATM CELL BYTE 44 | ATM CELL BYTE 43 |
| ATM CELL BYTE 42 | ATM CELL BYTE 41 | ATM CELL BYTE 40 | ATM CELL BYTE 39 |
| ATM CELL BYTE 38 | ATM CELL BYTE 37 | ATM CELL BYTE 36 | ATM CELL BYTE 35 |
| ATM CELL BYTE 34 | ATM CELL BYTE 33 | ATM CELL BYTE 32 | ATM CELL BYTE 31 |
| ATM CELL BYTE 30 | ATM CELL BYTE 29 | ATM CELL BYTE 28 | ATM CELL BYTE 27 |
| ATM CELL BYTE 26 | ATM CELL BYTE 25 | ATM CELL BYTE 24 | ATM CELL BYTE 23 |
| ATM CELL BYTE 22 | ATM CELL BYTE 21 | ATM CELL BYTE 20 | ATM CELL BYTE 19 |
| ATM CELL BYTE 18 | ATM CELL BYTE 17 | ATM CELL BYTE 16 | ATM CELL BYTE 15 |
| ATM CELL BYTE 14 | ATM CELL BYTE 13 | ATM CELL BYTE 12 | ATM CELL BYTE 11 |
| ATM CELL BYTE 10 | ATM CELL BYTE 9 | ATM CELL BYTE 8 | ATM CELL BYTE 7 |
| ATM CELL BYTE 6 | ATM CELL BYTE 5 | ATM CELL BYTE 4 | ATM CELL BYTE 3 |
| ATM CELL BYTE 2 | ATM CELL BYTE 1 | ADAPTER ADDRESS | ADAPTER ADDRESS |

|31|          |0|

FIG. 7

METHOD OF OPERATING AN INTERNAL HIGH SPEED ATM BUS INSIDE A SWITCHING CORE

FIELD OF THE INVENTION

The invention relates to ATM network node equipment and more particular to a serial/parallel high speed bus designed to transfer ATM cells between adapters.

BACKGROUND ART

A telecommunication equipment is generally made of adapters plugged into a switching card, each adapter interfacing ATM network links.

FIG. 1A shows the architecture of such a telecommunication equipment.

All the adapters (10-1, . . . , 10-N) are connected to a switching card (12) which controls the cells transmission. The switching card is usually based on switching components such as the IBM PRIZMA chip.

Busses in the state of the art such as ISA (Industry Standard Architecture), MCA (Micro Channel Architecture) and PCI (Peripheral Control Interface) are made of a data bus, an address bus, a read/write signal and additional control lines. These signals are activated at certain period of time depending on the mode operations that are the bus request mode, the bus acknowledge mode, the address mode, the read/write mode and the bus release mode.

OBJECTS OF THE INVENTION

It is an object of the invention to simplify the ATM switching card by implementing an ATM cell serial/parallel bus that contains a data bus, two control signals and an adapter identification bus. The data bus has different actions depending on the mode operations. There is no need for additional signals such as address bus, read/write signals, etc.

It is another object of the invention to make possible the improvement of the performance of the ATM cell bus by increasing the clock frequency or the bus width.

SUMMARY OF THE INVENTION

The ATM bus (100) is composed of a clock signal, CLK, a synchronization signal, -SYNC, and a data bus, S(0-31). It is a synchronous bus running at any clock rates. The clock signal is generated by the backplane (20) and transmitted to each adapter (10-1, . . . 10-N).

During each clock cycle, the data bus has three serialized operation modes (or cycles) defined in this order: a bus_req cycle of 1 clock period, a bus_ack cycle of 1 clock period and an ATM cell_xfr cycle of 14 clock periods.

The free-running synchronization signal is generated on the backplane (20) and transmitted to each adapter (10-1, . . . , 10-N). The activation of the synchronization signal starts the bus_req cycle. To increase the bus performance, the synchronization signal is held active until an adapter activates its bus_request signal on one bit of its data bus S(0-31). The remaining data bus signals are left in high impedance state.

For the bus_ack cycle, an arbiter located in a control logic (102) on the backplane (20), determines which adapter has the bus granted for its data transfer by generating an acknowledge signal to the corresponding requester during one clock period following the deactivation of the synchronization signal.

The next fourteen clock periods starts the xfer_cycle for transferring one ATM cell from a requester adapter to a destination adapter. At the end of this transmission, another req_cycle starts by the activation of the synchronization signal.

The high speed ATM bus according to present invention is used in an ATM network node equipment for transferring ATM cells between a plurality of connected adapters, said ATM bus comprising a clock signal (CLK), a synchronization signal (SYNC), an adapter identification bus (SID) and a data bus (S(0-31)). Responsive to said clock signal (CLK) and to said synchronization signal, it behaves as an ATM cell serial/parallel bus so as to perform three operation modes on said data bus (S(0-31)):

a bus_request operation mode;

a bus acknowledge operation mode; and an ATM cell transfer operation mode from a first adapter to a second adapter.

Furthermore, the ATM bus is associated to means for determining the current operation mode of the ATM bus so as to ask the adapters to take appropriate actions.

According to the present invention, the method for transferring ATM cells between a plurality of connected adapters through a high speed ATM cell serial/parallel bus in an ATM network node equipment, said ATM bus comprising a clock signal (CLK), a synchronization signal (SYNC), an adapter identification bus (SID) and a data bus (S(0-31)); responsive to each of said clock cycle (CLK) and to said synchronization signal so as to perform successively said three operation modes on the data bus (S(0-31)), said method comprises the steps of:

requesting said ATM bus;

acknowledging said ATM bus; and transferring ATM cells from a first adapter to a second adapter through said ATM bus.

BRIEF DESCRIPTION OF THE DRAWINGS

FIG. 7 illustrates an example of the ATM cell format.

DETAILED DESCRIPTION OF THE INVENTION

Figure 1A:
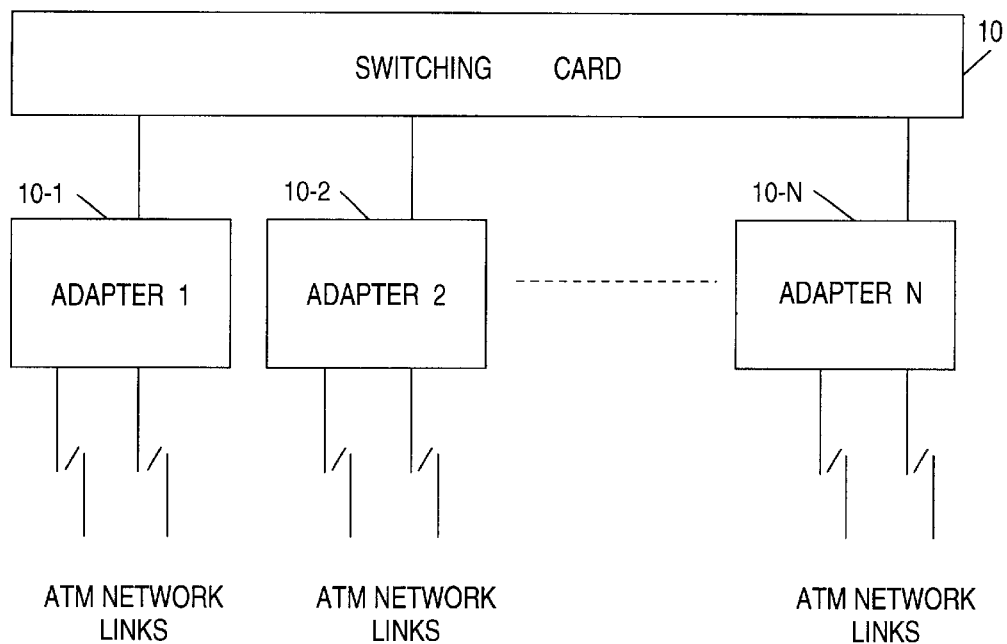
FIG. 1A shows the architecture of a telecommunication equipment in the prior art.
Figure 1B:
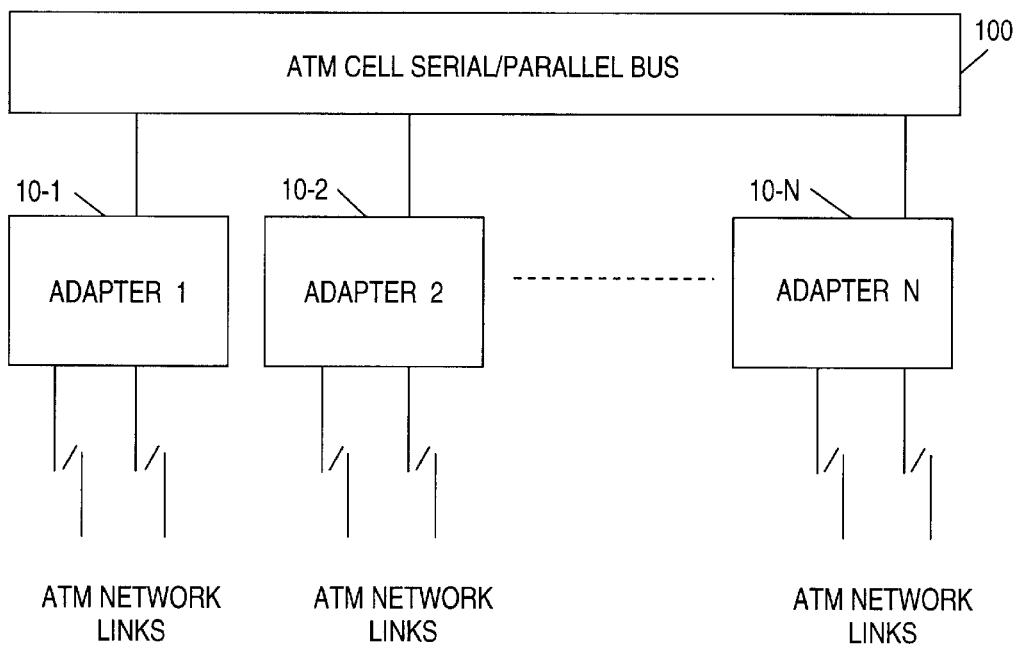
FIG. 1B shows the architecture of a new telecommunication equipment according to the present invention.

FIG. 1B shows the architecture of a new telecommunication equipment according to the present invention wherein the switching card (12) is replaced by a backplane (20) containing a high speed serial/parallel bus (100) specifically designed to transfer ATM cells. The remaining devices and connections are unchanged as compared to the implementation of FIG. 1A.

Figure 2A:
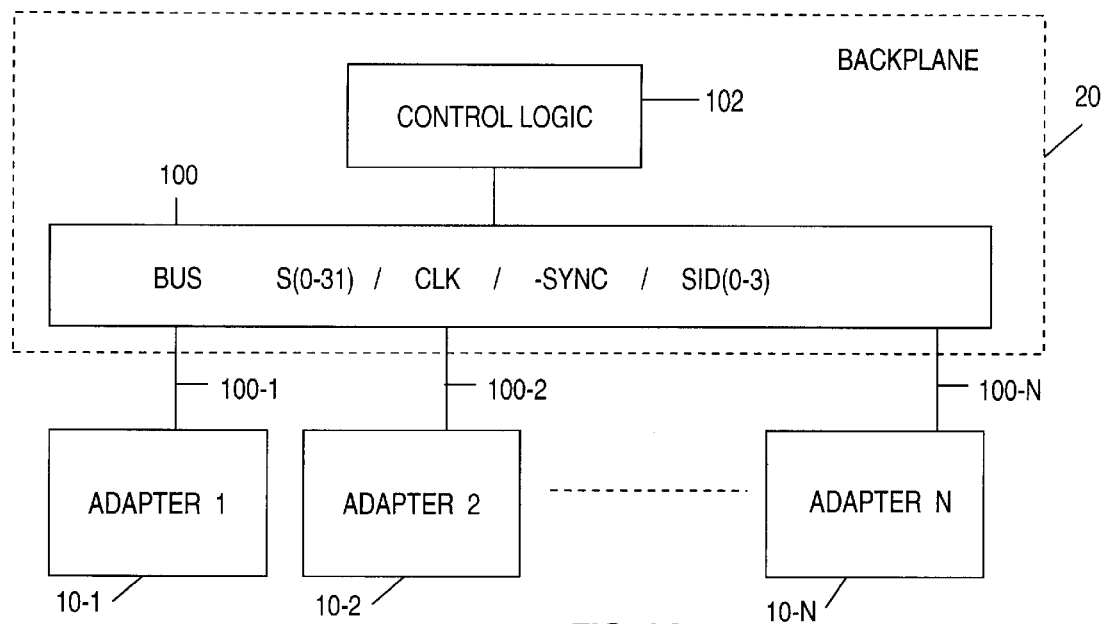
FIG. 2A is an overall view of the serial/parallel high speed ATM bus according to the present invention.

FIG. 2A is an overall view of the backplane (20) comprising the serial/parallel high speed ATM bus (100) connected to a control logic (102) allowing communication between the ATM bus (100) and the different adapters (10-1 , . . . , 10-N).

Figure 2B:
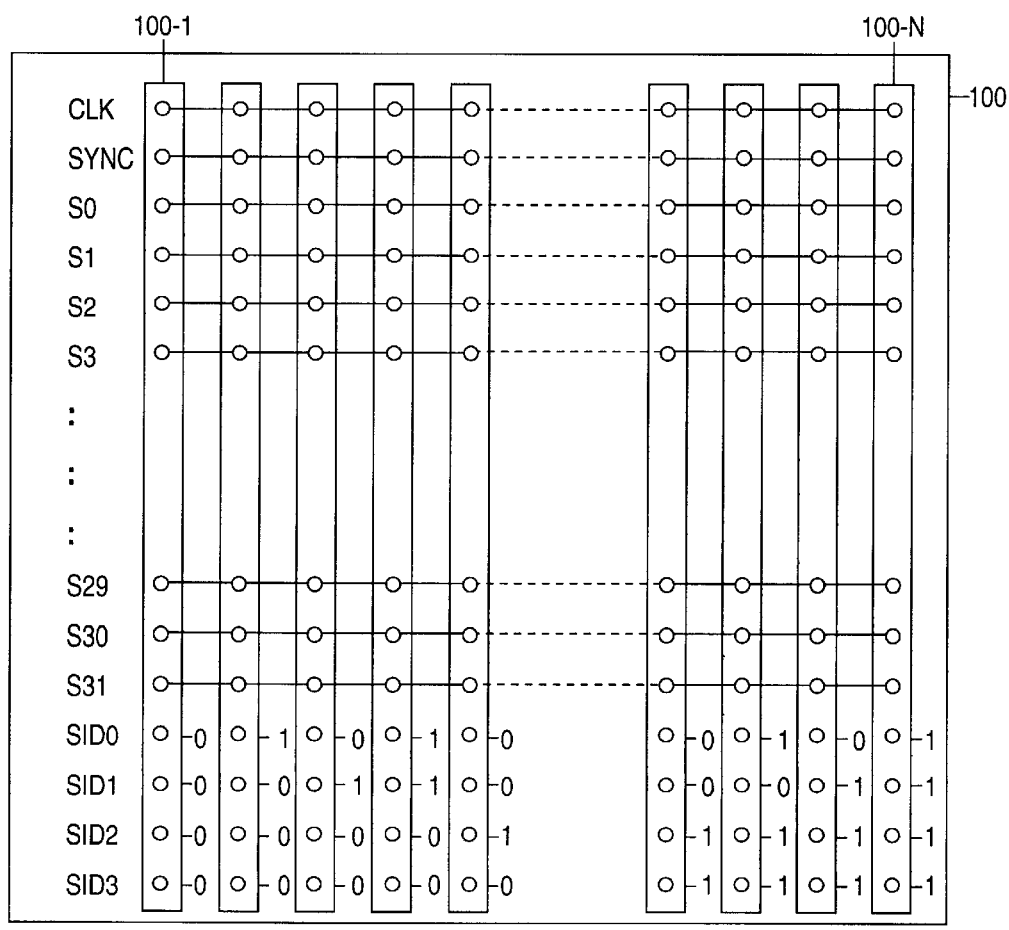
FIG. 2B shows the mechanical structure of the backplane of the present invention.

FIG. 2B shows the mechanical structure of the ATM bus (100). In this particular implementation, a structure of a 32-bit data bus S(0-31) is used. It is made of 16 slots decoded by SID(0-3) address lines. The Clock and Synchronization signals also have their own lines. It should be noted that these parameters can be changed at user's convenience.

Figure 3:
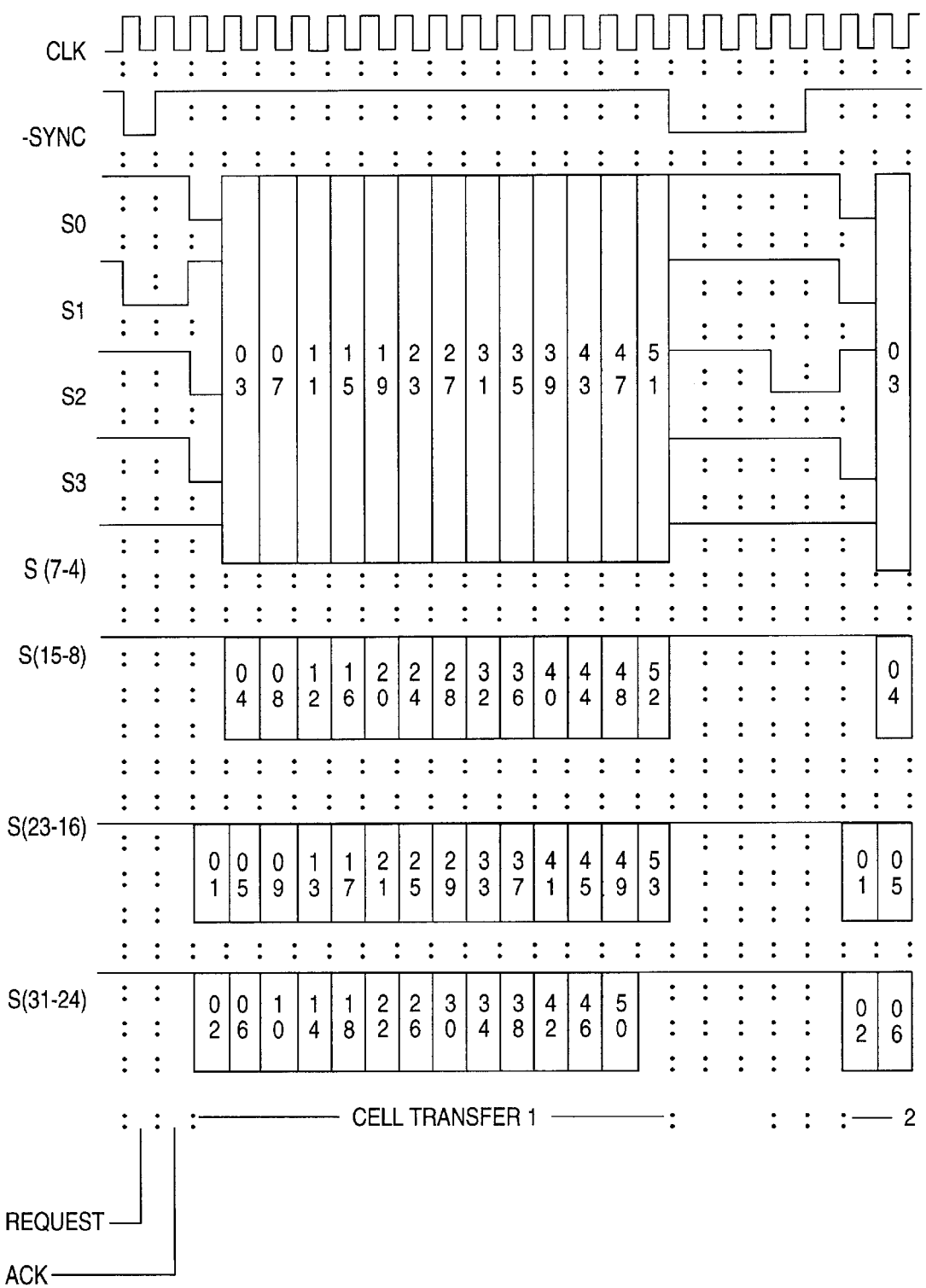
FIG. 3 shows an example of an ATM cell transfer.

FIG. 3 illustrates an example of the functionality of the ATM bus wherein an ATM cell is transferred from an adapter in slot 1 to an adapter in slot 2 (coded onto 4 bits, signal 2 has a falling edge) followed by an ATM cell transfer from adapter in slot 2 to an adapter in slot 4 (signal 3 has a falling edge).

The ATM bus (100) is only made of a clock signal, CLK, a synchronization signal, -SYNC, a data bus, S(0-31), and a slot_id address bus, SID(0-3), which guarantees the unicity of each adapter within the machine.

The ATM bus (100) is a synchronous bus running at any clock rates. It can be 33 MHz, 64 MHz or much higher if the technology is available. The clock signal is generated by the backplane (20) and transmitted to each adapter (10-1, . . . 10-N).

During each clock cycle, the data bus has three different serialized operation modes. Three mode of operations (or cycles) are defined in this order: a bus_req cycle, a bus_ack cycle and a cell_xfr cycle.

A bus_req cycle lasts at least one (1) clock period of time;

A bus_ack cycle lasts one (1) clock period of time and follows the bus_req cycle;

A cell_xfr cycle follows the bus_ack cycle and its duration depends on the data bus width (notion of parallelism). For a 32-bit data bus width, it lasts fourteen (14) clock periods of time. It should be noted that 14 clock periods are required because 14*4 bytes=56 bytes. These 56 bytes comprise an ATM cell of 53 bytes, 2 bytes of address and 1 miscellaneous byte.

A free-running synchronization signal is generated on the backplane (20) and transmitted to each adapter (10-1, . . . , 10-N).

When an adapter wants to transfer an ATM cell over the bus, it waits for the activation of the synchronization signal to activate its internal bus_request signal, -BREQ. This is the bus_req cycle. This signal is actually one bit of the data bus, S(0-31), depending on the location of the requesting adapter within the machine. If the adapter is plugged into slot 1, its bus_request signal has to be connected to the S(1) signal. If it is plugged into slot 10, its bus_signal has to be connected to S(10) signal. In each case, the remaining data bus signals are left in high impedance state.

To increase the bus performance, instead of having a round robin mechanism, the synchronization signal is held active until an adapter activates its bus_request signal.

When several bus_request signals are activated, an arbiter located in a control logic (102) of the backplane (20) determines which adapter has the bus granted for its data transfer. This is the bus_ack cycle. An acknowledge signal, generated by the logic of the backplane (20), is transmitted to the corresponding requester during one clock period following the deactivation of the synchronization signal.

The next fourteen clock periods correspond to the transfer of one ATM cell from a requester adapter to a destination adapter. This is the xfer_cycle. The address of the destination adapter is transmitted in the first two bytes followed by the 53 bytes of the ATM cell.

At the end of this transmission, another req_cycle starts by the activation of the synchronization signal.

Hardware Description of the Invention

Figure 4:
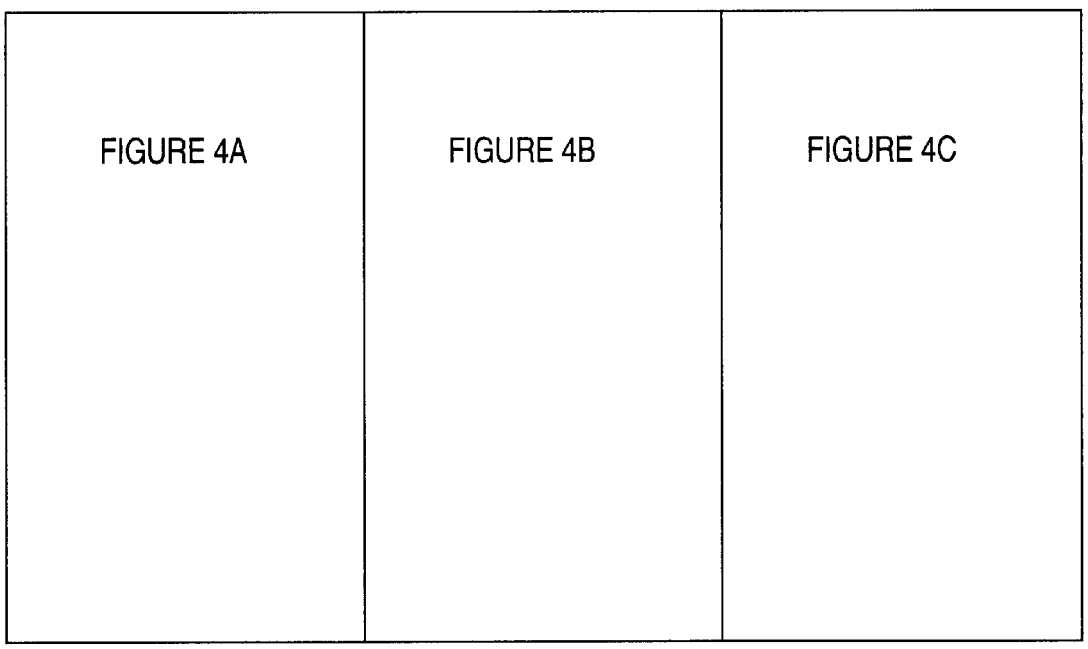
FIG. 4 gathering
Figure 4A:
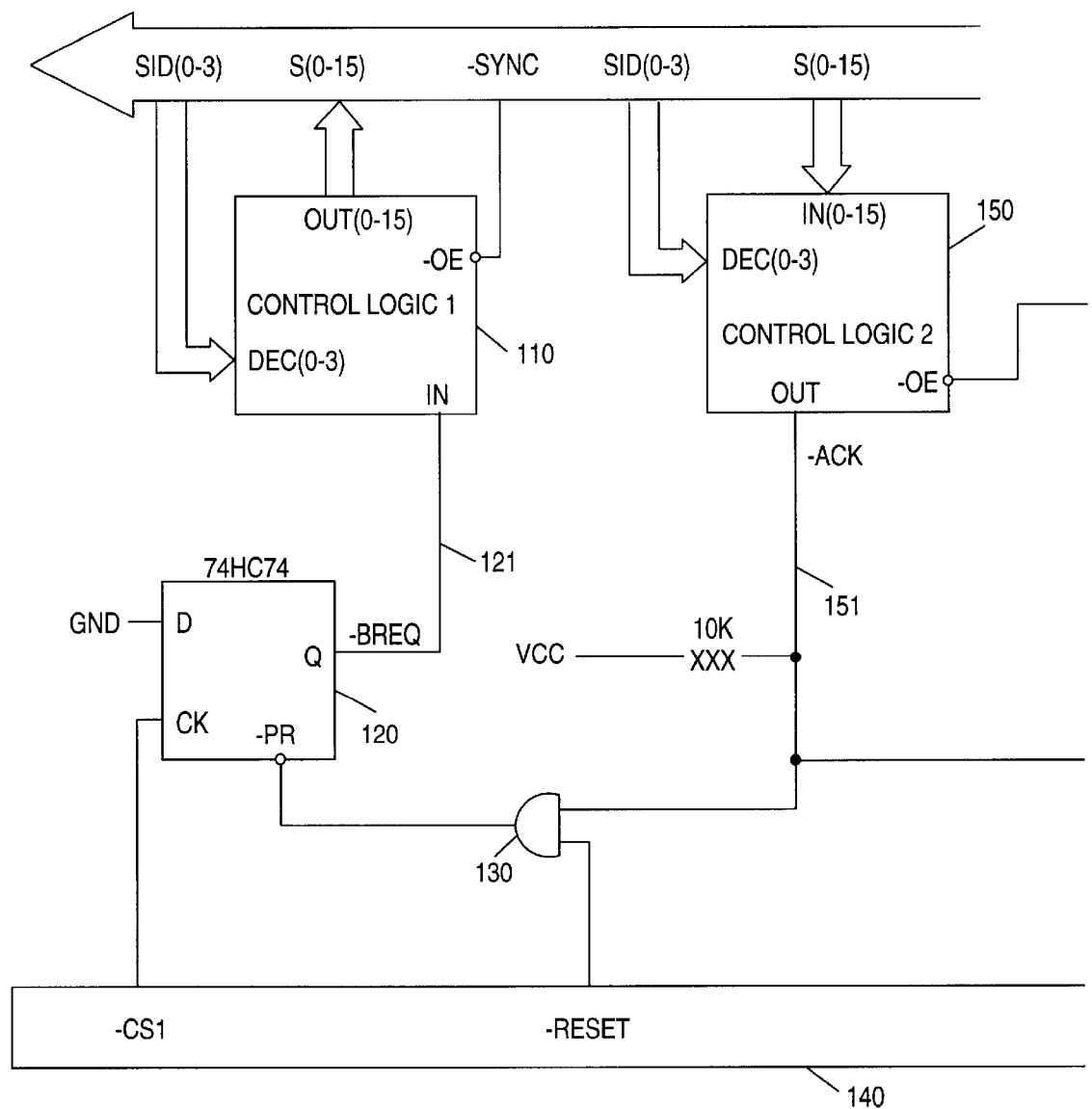
FIGS. 4A, 4B and 4C shows an architecture of an ATM bus interface with the adapters according to the present invention.
Figure 4B:
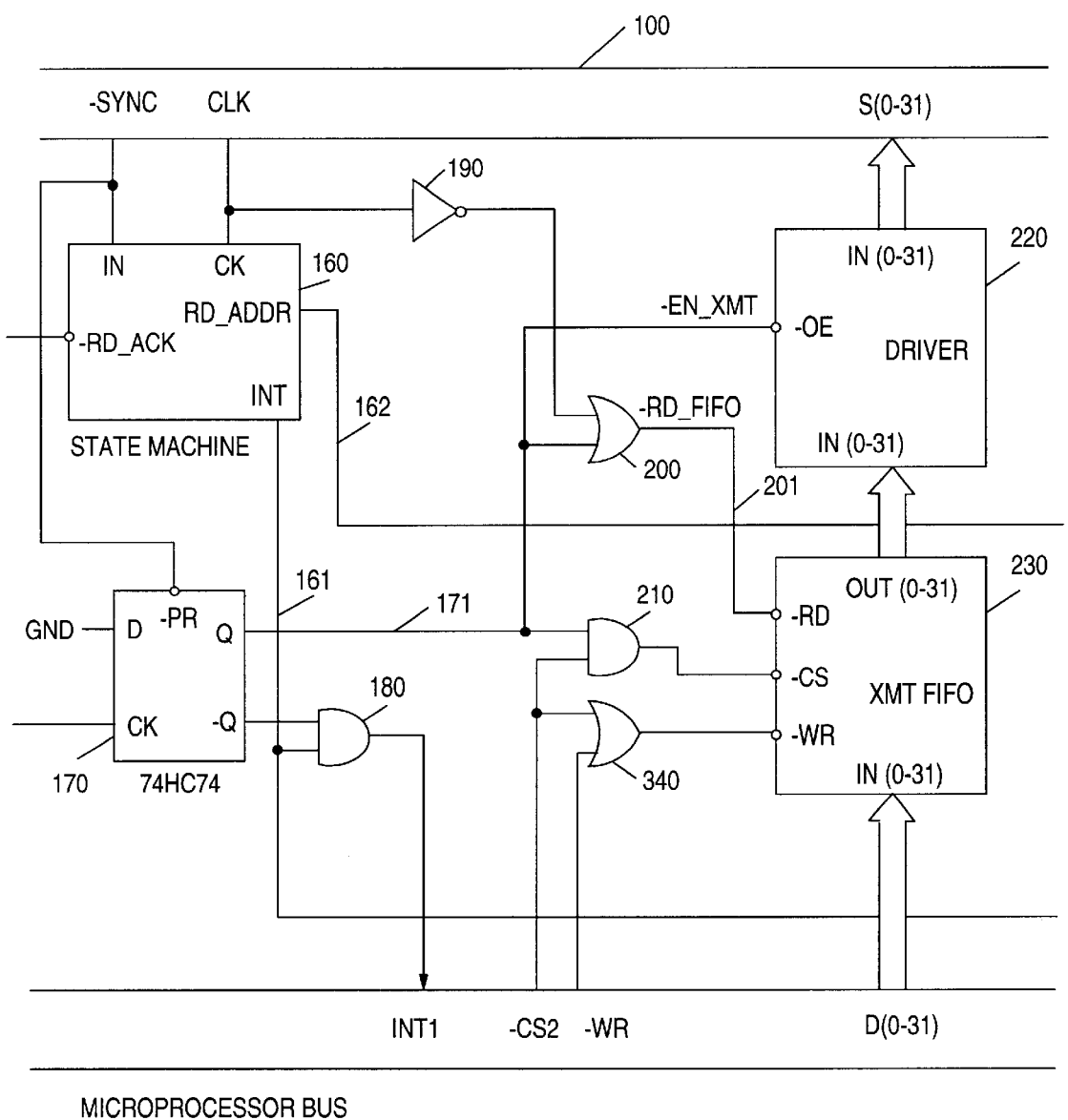
Figure 4C:
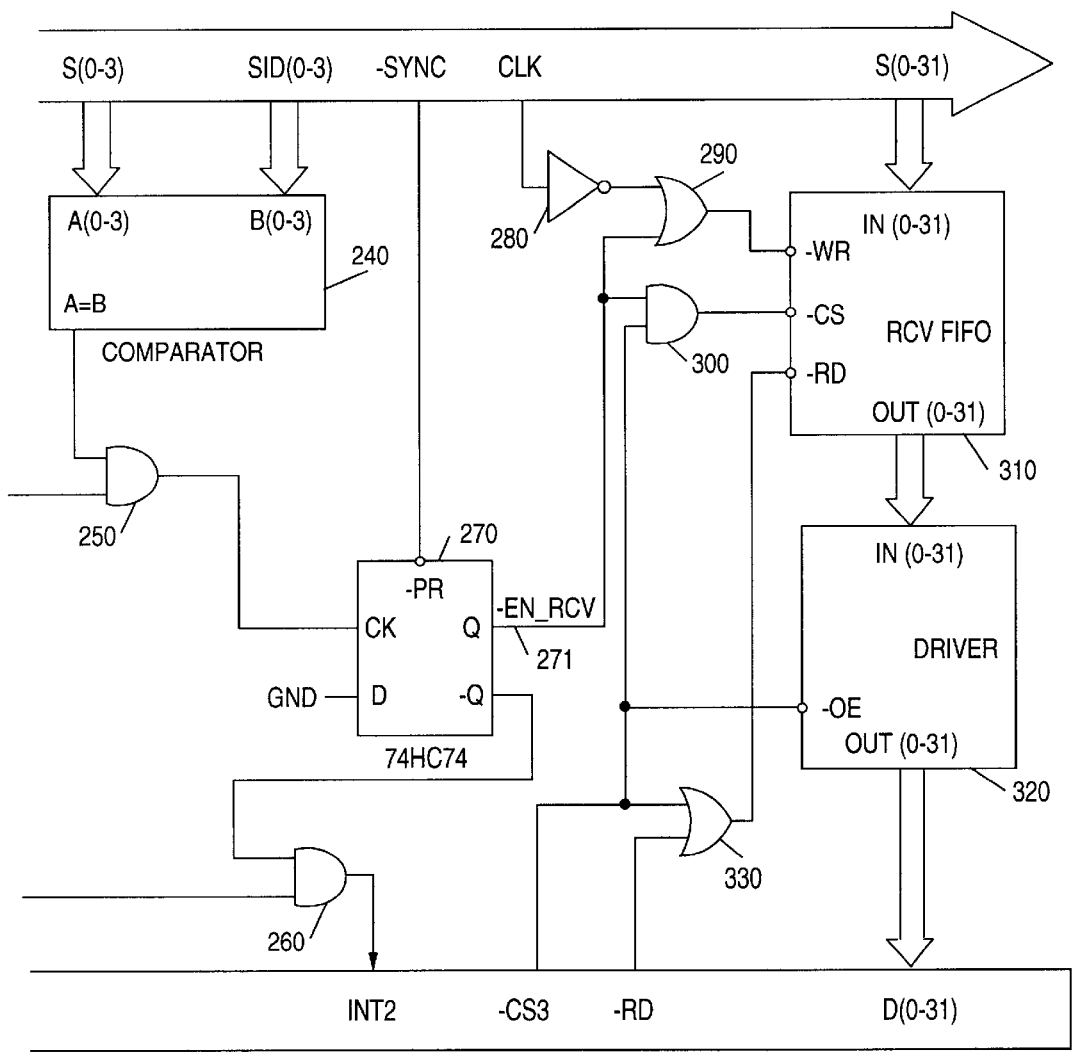

The set of FIGS. 4A–4C which is arranged in accordance with the diagram of FIG. 4, describes a possible implementation of the bus interface with the adapters.

The design comprises two busses: an ATM bus (100) and a general purpose bus (140) and more particularly a microprocessor bus. This latter allows a total flexibility to design an adapter whatever its network interface is.

The bidirectional 32-bit data bus, pin S(0-31), of bus (100) is connected to the input data bus, pin IN(0-31), of a receive_FIFO (310) and to the output data bus, pin OUT (0-31), of a driver (220).

The bidirectional 16-bit data bus, pin S(0-15), of bus (100) is connected to the input data bus, pin IN(0-15), of a control_logic_2 (150) and to the output data bus, pin OUT(0-15), of a control_logic_1 (110).

The bidirectional 4-bit data bus, pin S(0-3), of bus (100) is connected to the input port A bus, pin A(0-3), of a comparator (240).

The unidirectional 4-bit slot_id bus, pin SID(0-3), of bus (100) is connected to the input port B bus, pin B(0-3), of comparator (240), to the input decode bus, pin DEC(0-3), of control_logic_2 (150) and to the input decode bus, pin DEC(0-3), of control_logic_1 (110).

The clock lead, pin CLK, of bus (100) is connected to the input lead of an inverter (280), to the input lead of an inverter (190) and to the input clock lead, pin CK, of a state_machine (160).

The synchronization lead, pin -SYNC, of bus (100) is connected to the input preset lead, pin -PR, of a latch (270) of the type 74HC74, to the input preset lead, pin -PR, of a latch (170) of the type 74HC74, to the input lead, pin IN, of state_machine (160) and to the input output_enable lead, pin -OE, of control_logic_1 (110).

The bidirectional 32-bit data bus, pin D(0-31), of a general purpose bus (140) is connected to the input data bus, pin IN(0-31), of a transmit_FIFO (230) and to the output data bus, pin OUT(0-31), of a driver (320).

The output reset lead, pin -RESET, of general purpose microprocessor bus (140) is connected to one input lead of a 2-input AND gate 130.

The output chip_select_1 lead, pin -CS1, of general purpose microprocessor bus (140) is connected to the input clock lead, pin CK, of a latch (120) of the type 74HC74.

The output chip_select_2 lead, pin -CS2, of general purpose microprocessor bus (140) is connected to one input lead of a 2-input AND gate (210) and to one input lead of a 2-input OR gate (340).

The output chip_select_3 lead, pin —CS3, of general purpose microprocessor bus (140) is connected to one input lead of a 2-input AND gate (300), to one input lead of a 2-input OR gate (330) and to the input output_enable lead, pin -OE, of driver (320).

The output write lead, pin -WR, of general purpose microprocessor bus (140) is connected to the other input lead of 2-input OR gate (340).

The output read lead, pin -RD, of general purpose microprocessor bus (140) is connected to the other input lead of 2-input OR gate (330).

The output lead of a 2-input AND gate (180) is driving the interrupt lead, pin INT1, of general purpose microprocessor bus (140).

The output lead of a 2-input AND gate (260) is driving the interrupt lead, pin INT2, of general purpose microprocessor bus (140).

The output 32-bit data bus, pin OUT(0-31), of receive_FIFO (310) is connected to the input data bus, pin IN(0-31), of driver (320).

The output 32-bit data bus, pin OUT(0-31), of transmit_FIFO (230) is connected to the input data bus, pin IN(0-31), of driver (220).

The positive_output lead (121), pin Q, of latch (120) is connected to the input lead, pin IN, of control_logic_1 (110). This lead (121) is further referred in the description as -BREQ signal.

The output lead of 2-input AND gate (130) is connected to the input preset lead, pin -PR, of latch (120). The input data lead, pin D, of latch (120) is connected to the GND.

The output lead (151), pin OUT, of control_logic_2 (150) is connected to the other input lead of 2-input AND gate (130), to the input clock lead, pin CK, of latch (170) and to a lead of a 10K resistor. This lead (151) is further referred in the description as -ACK signal. The other lead of 10K resistor is connected to Vcc.

The output read_acknowledge lead, pin -RD_ACK, of state_machine (160) is connected to the input output_enable lead, pin -OE, of control_logic_2 (150).

The output read_address lead (162), pin RD_ADDR, of state_machine (160) is connected to one input lead of a 2-input AND gate (250). The other input lead of 2-input AND gate (250) is connected to the output lead, pin A=B, of comparator (240). The output lead of 2-input AND gate (250) is connected to the input clock lead, pin CK, of latch (270).

The output interrupt lead (161), pin INT, of state_machine (160) is connected to one input lead of 2-input AND gate (180) and to one input lead of 2-input AND gate (260). The other input lead of 2-input AND gate (180) is connected to the negative_output lead, pin -Q, of latch (170). The other input lead of 2-input AND gate (260) is connected to the negative_output lead, pin -Q, of latch (270).

The positive_output lead (171), pin Q, of latch (170) is connected to the other input lead of 2-input AND gate (210), to one input lead of a 2-input OR gate (200) and to the input output_enable lead, pin -OE, of driver (220). This lead (171) is further referred in the description as -EN_XMT signal. The data input lead, pin D, of latch (170) is connected to ground.

The other input lead of 2-input OR gate (200) is connected to the output lead of inverter (190). The output lead (201) of 2-input OR gate (200) is connected to the input read lead, pin -RD, of transmit_FIFO (230). This lead (201) is further referred in the description as -RD_FIFO signal.

The output lead of 2-input AND gate (210) is connected to the input chip_select lead, pin -CS, of transmit_FIFO (230). The output lead of 2-input OR gate (340) is connected to the input write lead, pin -WR, of transmit_FIFO (230).

The input data lead, pin D, of latch (270) is connected to the GND. The positive_output lead (271), pin Q, of latch (270) is connected to one input lead of a 2-input OR gate (290) and to the other input lead of 2-input AND gate (300). This lead (271) is further referred in the description as -EN_RCV signal.

The other input lead of 2-input OR gate (290) is connected to the output lead of inverter (280). The output lead of 2-input AND gate (300) is connected to the input chip_select lead, pin -CS, of receive_FIFO (310). The output lead of 2-input OR gate (290) is connected to the input write lead, pin -WR, of receive_FIFO (310). The output lead of 2-input OR gate (330) is connected to the input read lead, pin -RD, of receive_FIFO (310).

Figure 5:
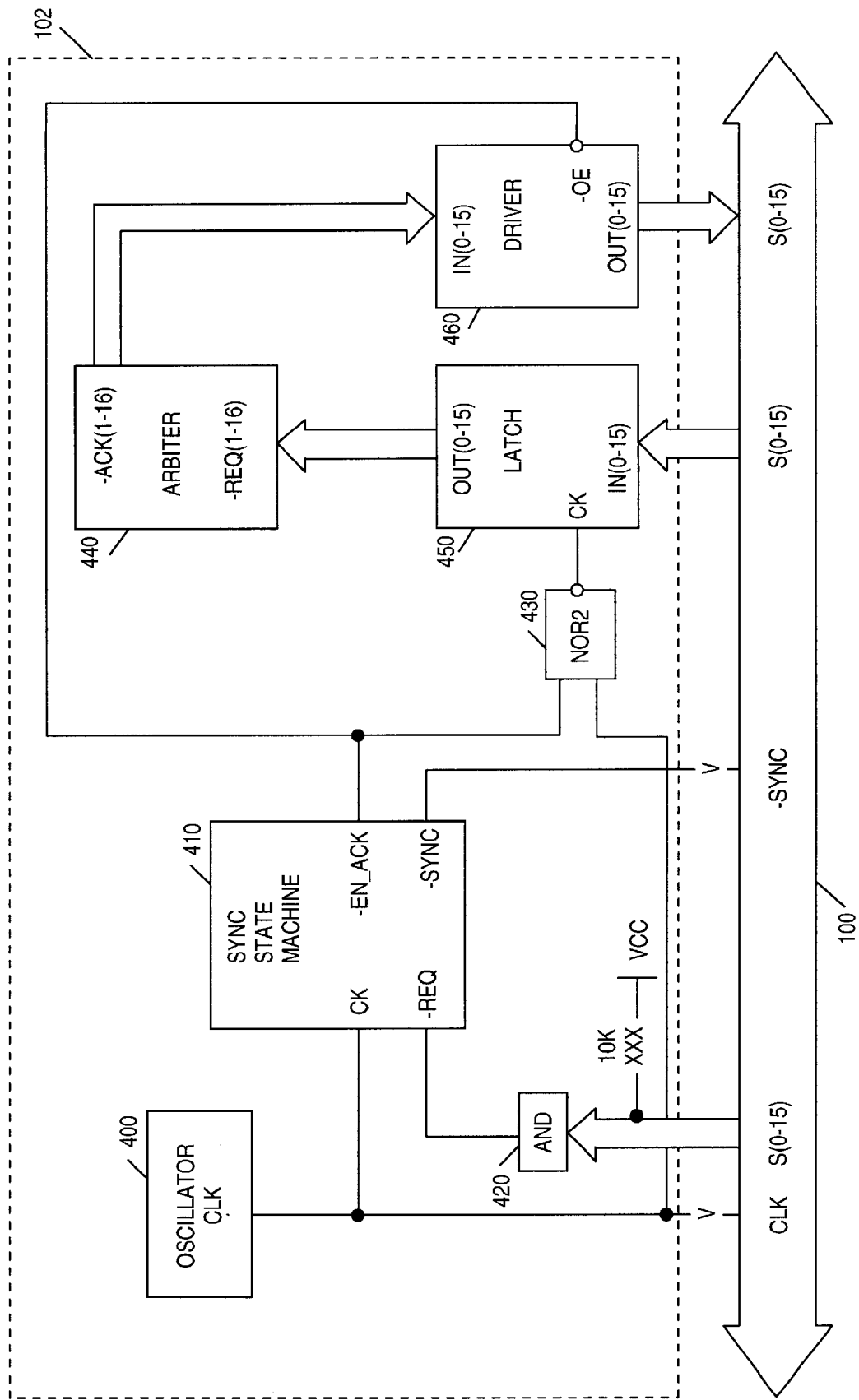
FIG. 5 shows the circuit of a control logic associated to the ATM bus.

FIG. 5 shows a possible implementation of the backplane (20). The bidirectional 16-bit data bus, pin S(0-15), of bus (100) is connected to the output data bus, pin OUT(0-15), of a driver (460), to the input data bus, pin IN(0-15), of a latch (450) and to the input leads of a 16-input AND gate (420). In addition, each signal line S(x) is connected to a lead of a 10K resistor, the other lead being connected to Vcc.

The output bus, pin OUT(0-15), of latch (450) is connected to the input request bus, pin −REQ(1-16), of an arbiter (440). The output acknowledge bus, pin −ACK(1-16), of arbiter (440) is connected to the input data bus, pin IN(0-15), of driver (460).

The output lead of 16-input AND gate (420) is connected to the input request lead, pin -REQ, of a SYNC_state_machine (410).

The output synchronization lead, pin -SYNC, of SYNC_state_machine (410) is driving the synchronization signal on bus (100).

The output enable_acknowledge lead, pin -EN_ACK, of SYNC_state_machine (410) is connected to one input lead of a 2-input NOR gate (430) and to the input output_enable lead, pin -OE, of driver (460).

The output lead of 2-input NOR gate (430) is connected to the input clock lead, pin CK, of latch (450).

The output clock lead, pin CLK, of a free running oscillator (400) is connected to the input clock lead, pin CK, of SYNC_state_machine (410), to the other input lead of 2-input NOR gate (430) and is driving the clock signal on bus (100).

Functional Description of the Invention

A free-running oscillator (400) located in the backplane (20), distributes to each adapter the system clock, signal CLK of system bus (100).

Figure 6:
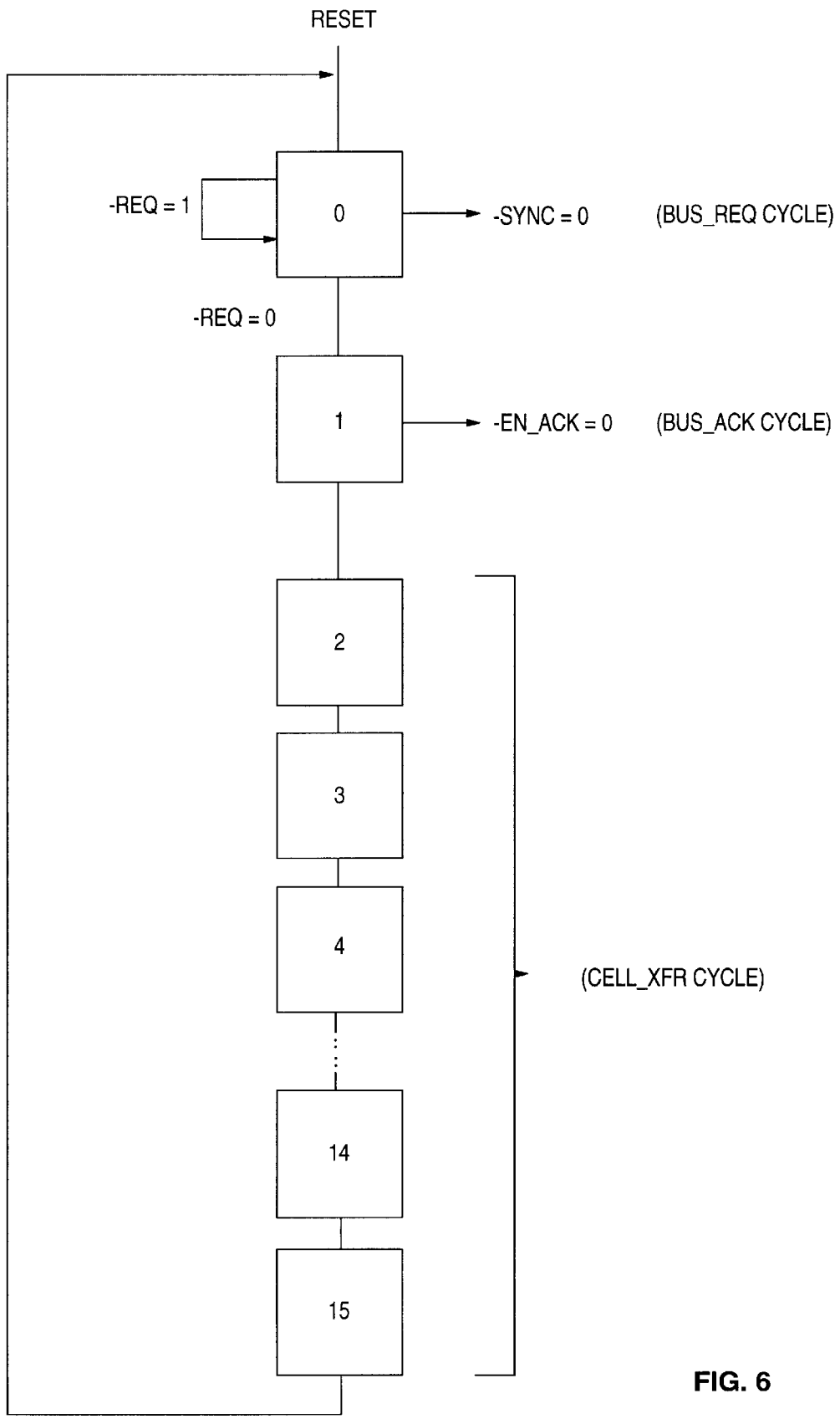
FIG. 6 illustrates a mode operation of a state machine in the backplane.

FIG. 6 describes an operation of the SYNC_state_machine (410) located in the control logic (102). After power-on, it takes control of the bus operation. Until an adapter activates its request signal, the SYNC_state_machine input lead, pin -REQ, is held high through AND gate 420 because the S(0-15) data bus of system bus (100) is pulled high through pull-up resistors. The state machine remains in state_0 which is the bus_req cycle. In this state, the -SYNC output signal is activated on system bus (100) to notify each adapter to request the bus if necessary.

Let's assume that adapter A wants to transmit an ATM cell to adapter B. Processor A loads into a 32-bit transmit FIFO (230) the address of adapter B and the ATM cell according to the format described in FIG. 7. In this example, a larger than 32-bit bus may be used. Processor A performs fourteen 32-bit write operations through microprocessor bus (140) using the data bus, pin D(0-31), the write signal, pin -WR and the transmit FIFO chip_select signal, pin -CS2. For each write access the chip select input lead, pin -CS, of XMT_FIFO (230) is activated through AND gate (210) and the write input lead, pin -WR, of XMT_FIFO 230) is activated through OR gate (340).

When the load is complete processor A issues a bus request command to get control of system bus (100). This operation is done through microprocessor bus (140) using the chip select signal, pin -CS1. On the rising edge of this signal the output lead (121), signal -BREQ, of latch (120) is activated.

Figure 8:
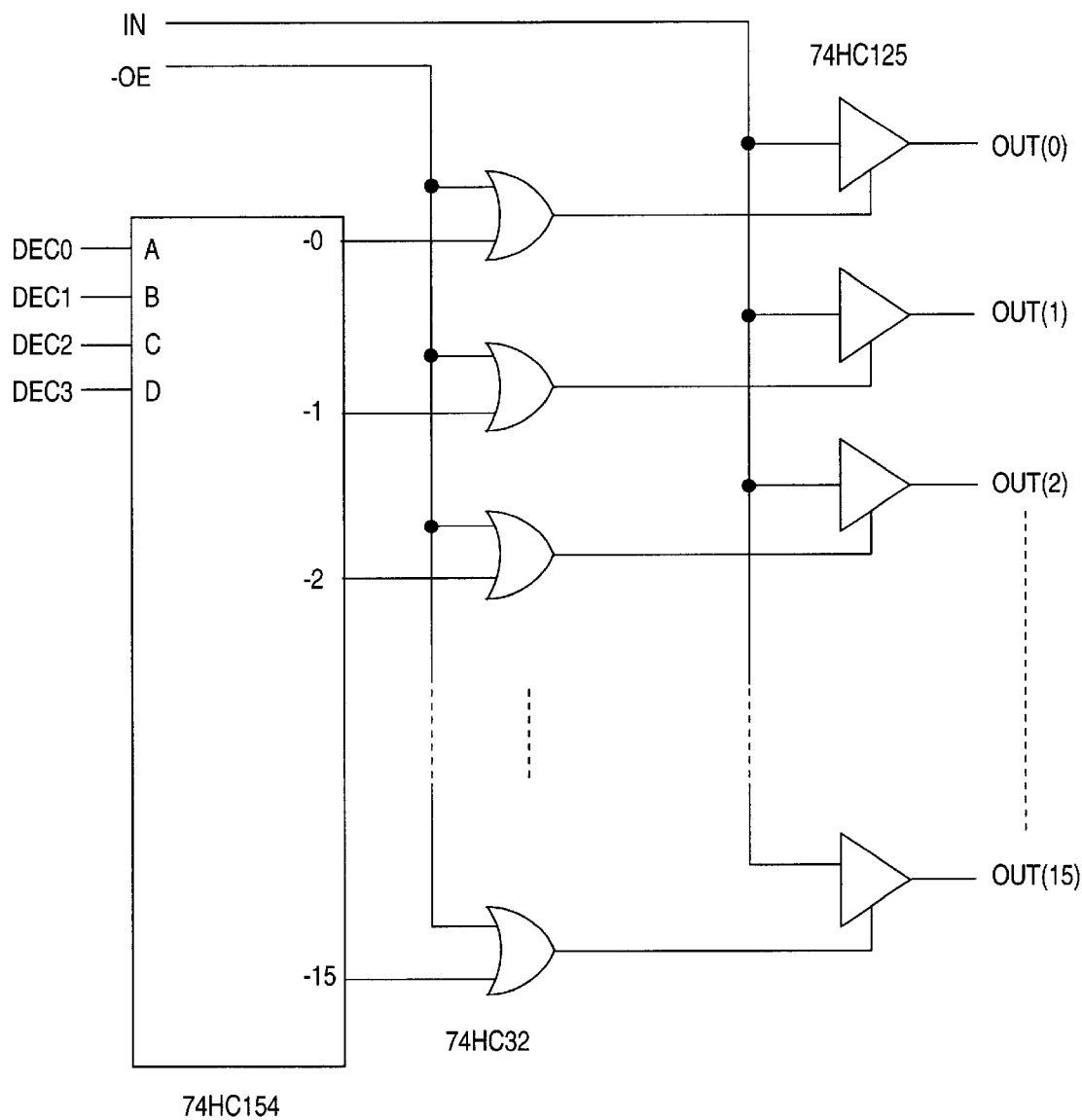
FIG. 8 shows the circuit of a first control logic of the ATM bus interface.

Control_logic_1 (110) has two functions: first, decode logic of the physical location of the adapter in the transmission and reception; and second, activate a signal of the data bus among the 16 signals corresponding to the adapter selected. It routes this signal to one data line of data bus S(0-15) of system bus (100). This data line corresponds to the slot location the adapter is plugged-in. FIG. 8 describes the control_logic_1. A 4-to-16 decoder of the type 74HC154 receives the encoded address of the slot, bus SID(0-3), from system bus (100). Only the output lead corresponding to the slot address is activated to route the incoming bus_request signal -BREQ when the synchronization signal -SYNC is activated.

When SYNC_state_machine (410) detects an active signal on its request input, pin -REQ, it jumps to state_1. This is the bus_ack cycle where the -SYNC output signal is turned off and the -EN_ACK output signal is activated for one clock period. During this cycle the content of data bus S(0-15) is stored in 16-bit latch (450) on the rising edge of a clock generated through NOR gate (430).

Figure 9:
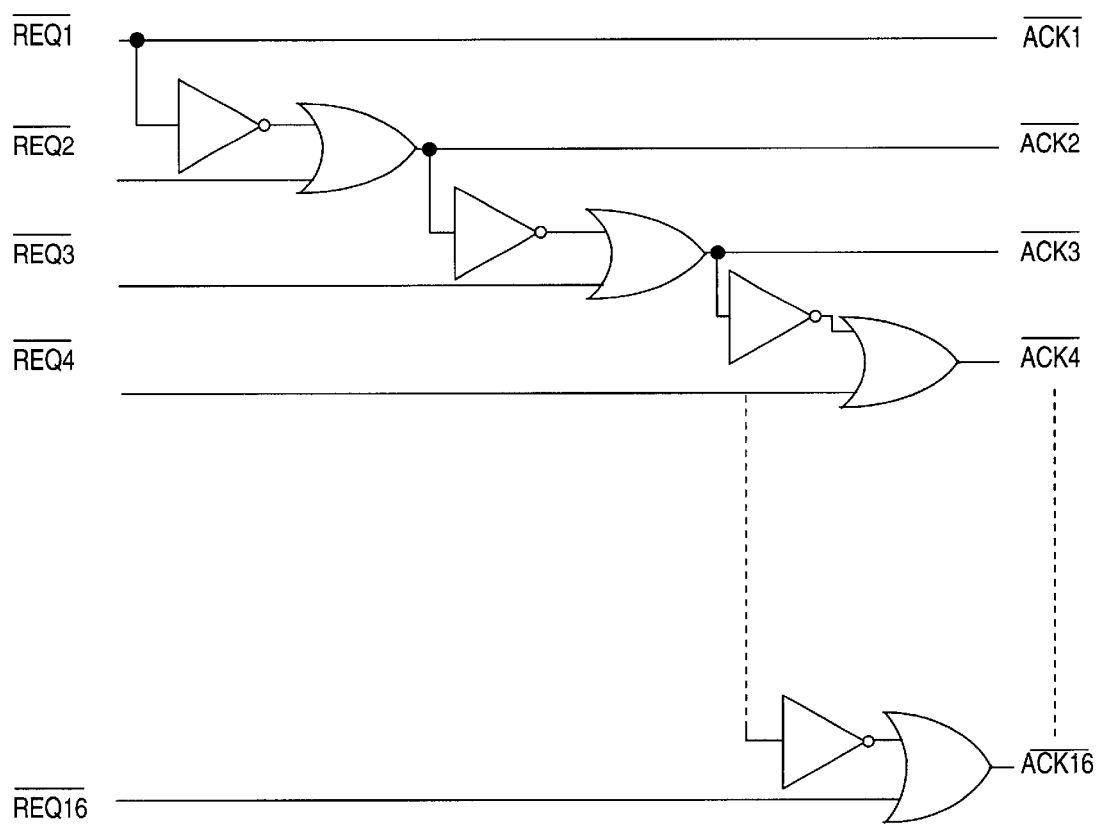
FIG. 9 shows the circuit of an arbiter of the backplane.

Therefore, latch (450) contains the bus request signals driven by each adapter (in this example only the bus request signal of adapter A is activated). An arbiter (440) receives these requests and grants the bus through 16-bit driver (460) to the adapter having the highest priority. As an example FIG. 9 describes one design of such arbiter.

Figure 10:
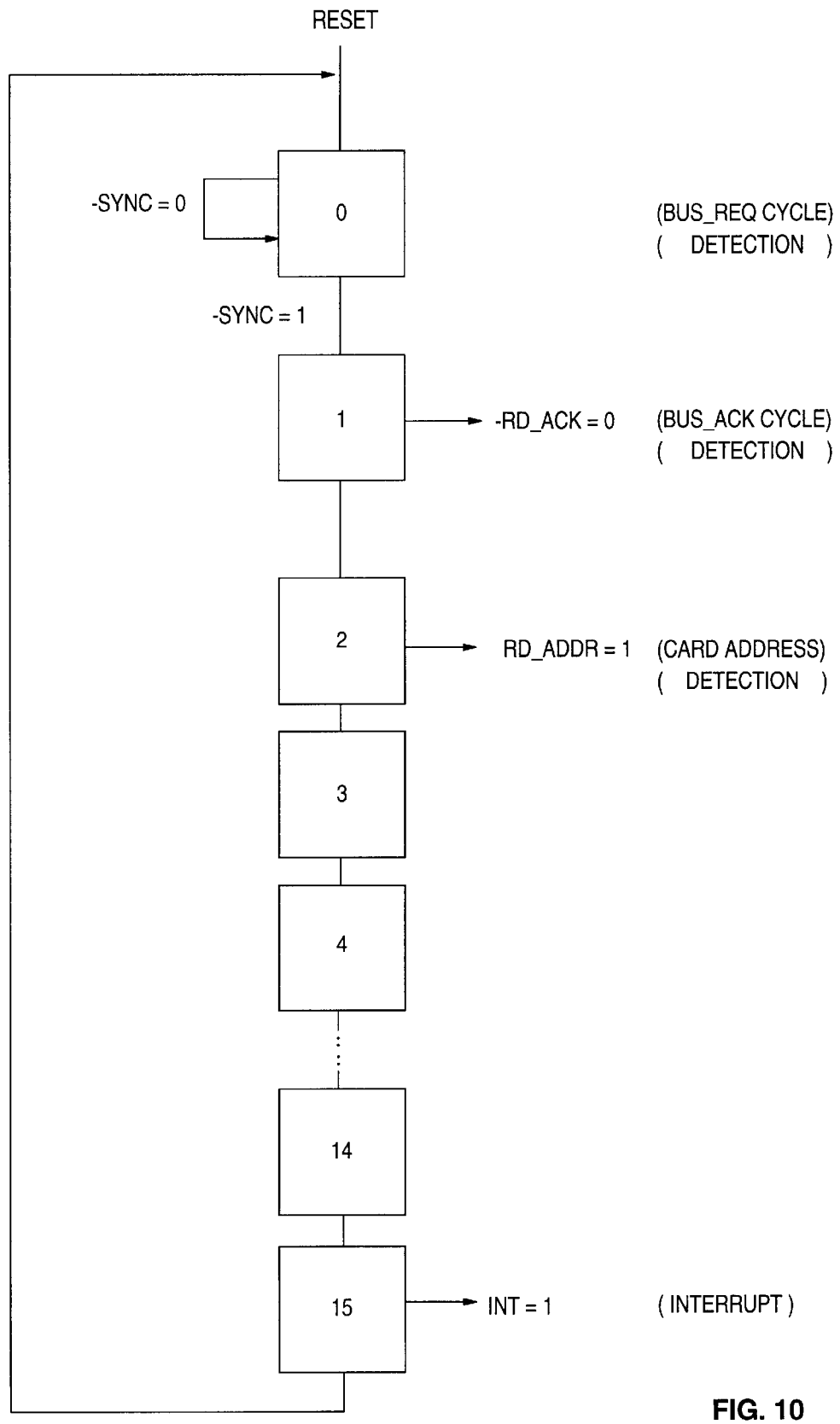
FIG. 10 shows the circuit of a control state machine of the ATM bus interface.

On each adapter, a control state machine (160) determines the current bus operation mode (cycle) to ask the adapters to take appropriate actions. FIG. 10 describes an operation mode of the control state machine (160). As long as the synchronization signal -SYNC is active no action is taken. The state machine remains in state_0 which is the bus_req cycle. When the synchronization signal is turned off, state machine (160) jumps to state_1 which is the bus_ack cycle. During this cycle, the read_acknowledge output signal -RD_ACK is activated, which enables thus the output enable input signal of control_logic_2 (150).

Control_logic_2 (150) receives the data bus S(0-15) from system bus (100) which is carrying the bus grant signal at this stage. Control_logic_2 decodes and determines if the adapter has been granted the bus.

Figure 11:
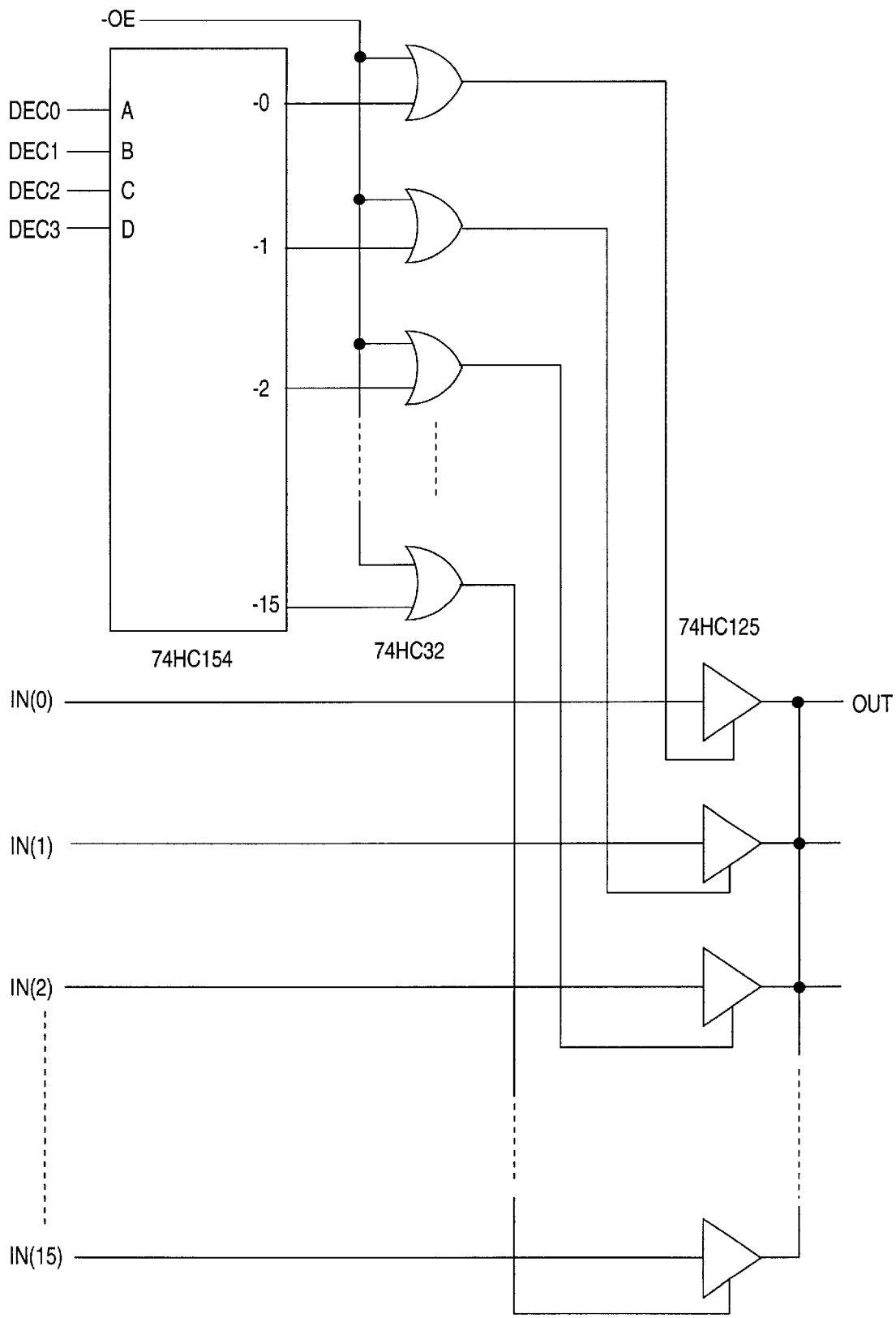
FIG. 11 shows the circuit of a second control logic of the ATM bus interface.

FIG. 11 describes the operations of control_logic_2 (150). This latter has two functions: first, decode logic of the physical location of the adapter in the transmission and reception; and second, decode the activation of a signal of the data bus among the 16 signals so as to select the adapter that performs the ATM cell transfer. The only one data line activated on the S(0-15) data bus is routed to the output lead (151), signal -ACK, if this data line is decoded by a 4-to-16 decoder of the type 74HC154 which receives the encoded address of the slot, bus SID(0-3), from system bus (100). If the adapter is not granted the bus the output lead (151), signal –ACK, is held non-active through a pull-up resistor.

The next stage to be described is the cell_xfr cycle. At this stage there is a difference between the transmission and the reception. Let's start with the transmission by describing the mode of operation of adapter A.

Figure 12:
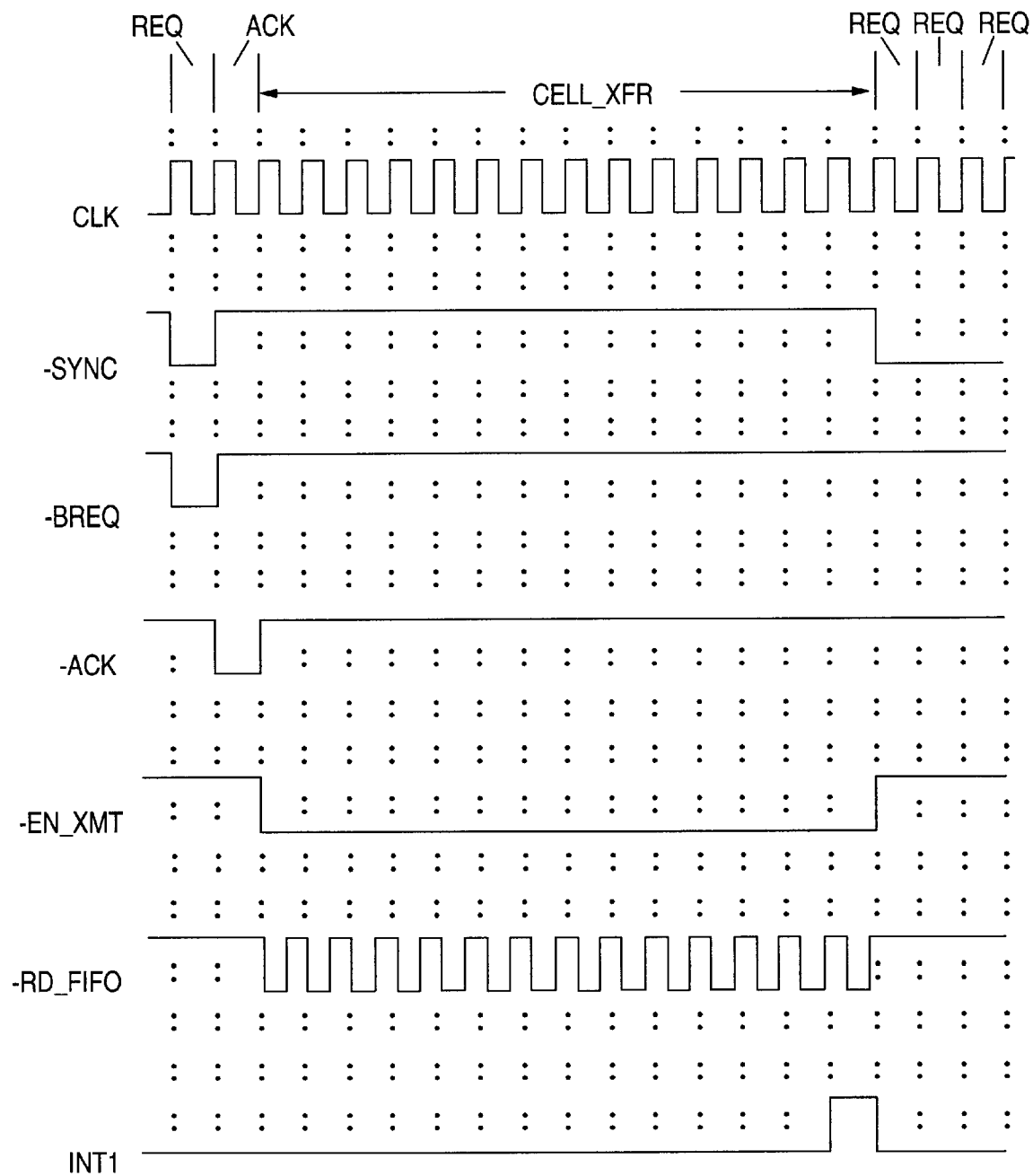
FIG. 12 illustrates a timing of an ATM cell transmission.

FIG. 12 describes the timing of an ATM cell transmission. The cell_xfr cycle lasts 14 clock periods for a total of 56 bytes to be exchanged over system bus (100). During this cycle SYNC_state_machine (410) is running from state_2 to state_15 without taking any actions. In parallel control state_machine (160) is running from state_2 to state_15 but is taking two actions: the read_address output lead, pin RD_ADDR, is activated during state_2 while the interrupt output lead, pin INT, is activated during state_15. The read_address output signal concerns the receive adapter and therefore its function will be described later.

Adapter A has been granted the bus and therefore the bus_acknowledge lead (151), signal -ACK, has been activated for one clock period. On its rising edge the enable_transmission output lead (171), signal -EN_XMT, of latch (170) is activated. The following actions take place:

a 32-bit driver (220) is now driving the content of XMT_FIFO (230) onto system bus (100) chip select input lead, pin -CS, of XMT_FIFO (230) is activated through AND gate (210);

a read input lead (201), pin -RD, of XMT_FIFO (230) is receiving a burst of 14 clock pulses through OR gate (200). This lead is referred as -RD_FIFO;

during the last word transfer the interrupt pulse generated by control state_machine (160) is transmitted to processor A through AND gate (180) and over microprocessor bus (140) on the INT1 signal. Processor A should be programmed in interrupt edge triggered mode to be alerted that the cell transmission is over.

At the end of the cell_xfr cycle both state machines (control state_machine (160) and SYNC_state_machine (410) return to state_0 where the synchronization signal -SYNC is activated. This signal deactivates the enable_transmission signal -EN_XMT. This is again the bus_req cycle until an adapter requests the system bus (100).

Figure 13:
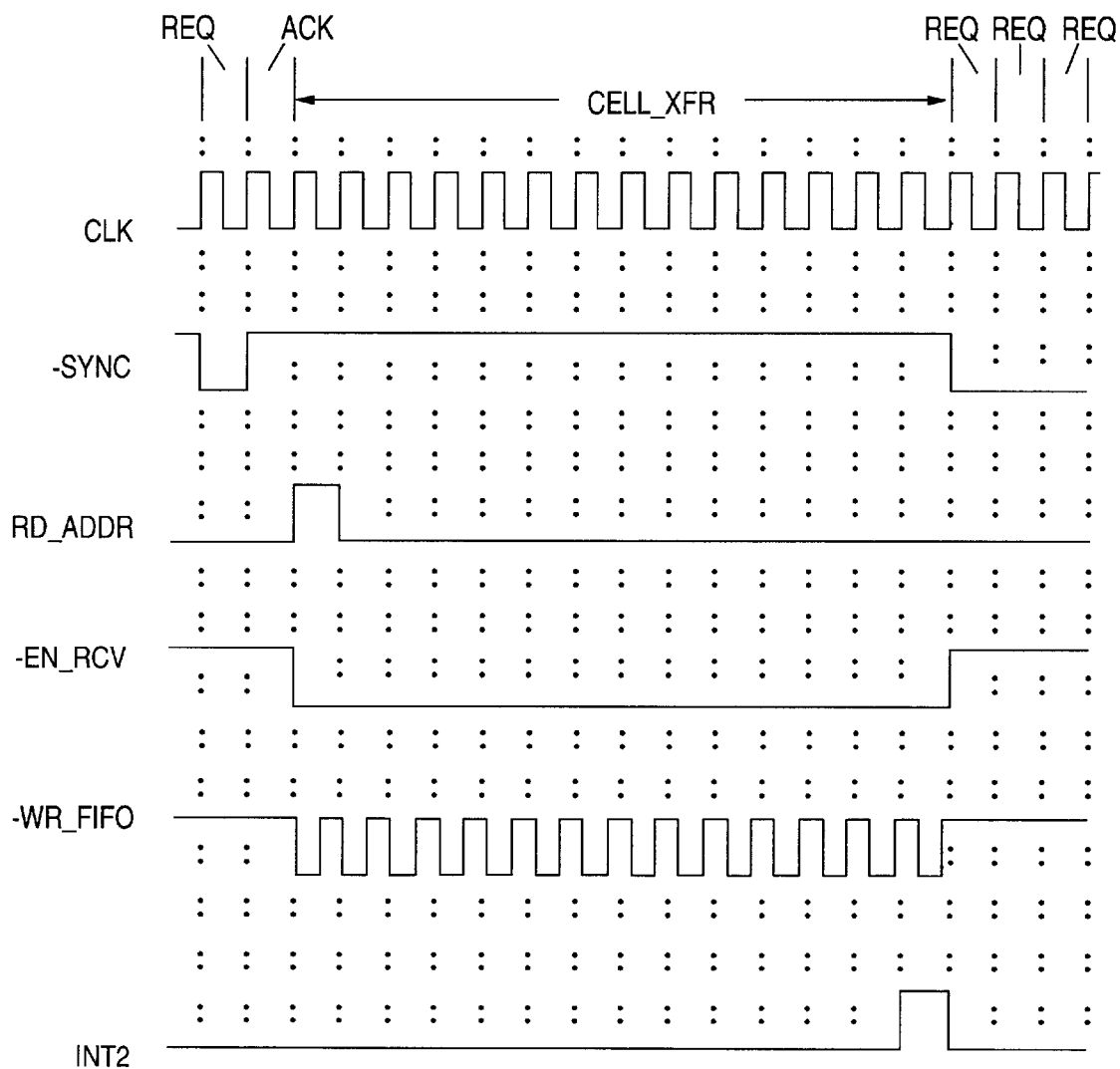
FIG. 13 illustrates a timing of an ATM cell reception.

Let's now describe the mode of operation of adapter B when the cell_xfr cycle starts. At this stage control state_machine (160) is in state_2 and the read_address output lead (162) is activated. This signal is used to decode the destination address of the adapter carried by system bus (100) on bus S(0-3). FIG. 13 describes the reception timing.

A comparator (240) compares the incoming data bus S(0-3) with the slot address of the adapter, pins SID(0-3). When the comparison matches a pulse is generated to the input clock of latch (270) through AND gate (250). On its rising edge the enable_reception output lead (271), signal -EN_RCV, of latch (270) is activated. The following actions take place:

chip_select input lead, pin -CS, of RCV_FIFO (310) is activated through AND gate (300);

write input lead, pin -WR, of RCV_FIFO ((310) is receiving a burst of 14 clock pulses through OR gate (290) (for a timing reason these clock pulses are inverted by inverter (280);

during the last word transfer the interrupt pulse generated by control state_machine (160) is transmitted to processor B through AND gate (260) and over microprocessor bus (140) on the INT2 signal;

upon reception of the interrupt, processor B performs fourteen 32-bit read operations to the receive FIFO (310) through microprocessor bus (140) using the data bus, pins D(0-31), the read signal, pin -RD and the receive FIFO chip select signal, pin -CS3. For each read access the chip select input lead, pin -CS, of RCV_FIFO (310) is activated through AND gate (300) and the read input lead, pin -RD, of RCV_FIFO (310) is activated through OR gate (330). The activation of the receive FIFO chip select signal enables 32-bit driver (320) to drive the content of RCV_FIFO (310) onto microprocessor bus (140), pins D(0-31).

Like processor A, it should be noted that processor B must be programmed in interrupt edge triggered mode to be alerted by the interruption.

At the end of the cell_xfr cycle control state_machine (160) returns to state_0 where the synchronization signal -SYNC is activated. This signal deactivates the enable_reception signal -EN_RCV.

Having thus described our invention, what we claim is as follows:

1. A high speed ATM bus (100) used in an ATM network node equipment for transferring ATM cells between a plurality of connected adapters (10-1, ..., 10-N), said ATM bus (100) comprising a clock signal (CLK), a synchronization signal (SYNC), an adapter identification bus (SID) and a data bus (S(0-31));

said high speed ATM bus (100) characterized in that it behaves as an ATM cell serial/parallel bus responsive to said clock signal (CLK) and to said synchronization signal so as to perform three operation modes on said data bus (S(0-31)):

a bus request operation mode;

a bus acknowledge operation mode; and an ATM cell transfer operation mode from a first adapter to a second adapter.

2. The ATM bus of claim 1 further comprising means (160) for determining the current operation mode of the ATM bus so as to ask the adapters to take appropriate actions.

3. The ATM bus of claims 1 or 2 further including a control logic (102) comprising:

means (410) for notifying each adapter (10-1, ..., 10-N) to request the free ATM bus (100);

means (450) for receiving bus request signals from said adapters;

means (440) for arbitrating said requests; and means (460) for granting the ATM bus to adapter having the highest priority.

4. The ATM bus of claim 3 to be used as a synchronous bus running at any clock rates.

5. The ATM bus of claims 1 or 2 wherein:

said bus request lasts at least 1 clock period;

said bus acknowledge lasts 1 clock period; and said data bus transfer last at least 14 clock periods.

6. The ATM bus of claims 1 or 2 further comprising:

means (110) for decoding physical location of said adapter and for activating selection signal of corresponding selected adapter so as to perform data transmission on said ATM bus; and means (150) for decoding physical location of said adapter and for activating selection signal of corresponding selected adapter so as to perform data reception on said ATM bus.

7. A cell transfer system for transferring ATM data cells between a plurality of communication adapters connected to the cell transfer system by a standard microprocessor bus comprising:

first transfer buffer means connected to the standard microprocessor bus for receiving from a source communication adapter ATM cells and the communication adapter ID's of the communication adapters involved in the cell transfer;

second transfer buffer means connected to the standard microprocessor bus for storing ATM cells directed to a destination adapter in an ATM cell transfer;

a high speed ATM transfer bus having a clock signal, a synchronization signal, a communication adapter identification bus and a data bus interconnecting the first and second transfer buffer means; and, bus control means responsive to signals on the standard microprocessor bus from the communication adapters involved in an ATM cell transfer for controlling the high speed ATM transfer bus and providing in sequence in response to a request to transfer an ATM cell from a source to a destination communication adapter the following bus operation modes;

a bus request mode, a bus acknowledge mode, and an ATM cell transfer mode from the first transfer buffer means to the second transfer buffer means.

8. The ATM cell transfer system set forth in claim 7 in which the bus control means:

notifies the communication adapters that the transfer bus is available;

receives bus requests from the communication adapters;

arbitrates bus requests when more than one are simultaneously present; and grants the bus to the communication adapter having the highest priority.

9. In a cell transfer system for transferring ATM data cells between a plurality of communication adapters connected to the cell transfer system by a standard microprocessor bus and including a first transfer buffer means connected to the standard microprocessor bus for receiving from a source communication adapter ATM cells, a second transfer buffer means connected to the standard microprocessor bus for storing ATM cells directed to a destination adapter in an ATM cell transfer, a high speed ATM transfer bus having a clock signal, a synchronization signal, a communication adapter identification bus and a data bus interconnecting the first and second transfer buffer means a method of operating the cell transfer system comprising the steps:

at the source communication adapter loading an ATM cell for a recipient adapter in the first transfer buffer and requesting the high speed transfer bus when available;

issuing an acknowledgment to the requesting communication adapter when the request is valid;

transferring the contents of the first transfer buffer to the second transfer buffer;

after transfer of the cell notifying the recipient communication adapter of the availability of the cell in the second transfer buffer; and, signaling the availability of the cell transfer bus when the cell transfer is complete.

10. The method set forth in claim 9 in which simultaneous bus request are arbitrated.

* * * * *